United States Patent [19]
Sommer

[11] Patent Number: 6,160,917
[45] Date of Patent: Dec. 12, 2000

[54] METHOD OF CALCULATING MOTION VECTORS

[75] Inventor: Peter Sommer, Braunschweig, Germany

[73] Assignee: U.S. Philips Corporation, New York, N.Y.

[21] Appl. No.: 09/133,619

[22] Filed: Aug. 13, 1998

[30] Foreign Application Priority Data

Aug. 14, 1997 [DE] Germany .......................... 197 35 213
Oct. 11, 1997 [DE] Germany .......................... 197 45 029

[51] Int. Cl.⁷ ...................................................... G06K 9/36
[52] U.S. Cl. ............................................................ 382/236
[58] Field of Search .................................. 382/236, 209; 348/415

[56] References Cited

U.S. PATENT DOCUMENTS 5,784,108  7/1988  Skaletzky et al. ...................... 382/209

OTHER PUBLICATIONS

"Upconversion MPEG—ubertragener Bildsignale" by Appelhans, Bussmann, Schroder, published in the 17th vol. (1996, pp.555–572) of the Fernseh–und Kinotechnischen Gesellschaft.

*Primary Examiner*—Jose L. Couso
*Assistant Examiner*—Anh Hong Do
*Attorney, Agent, or Firm*—Steven B. Biren

[57] ABSTRACT

A method in which motion vectors relating to frames and fields are calculated from motion vectors for a digital picture signal wherein for motion vectors relating to frames, the method wherein motion vectors provided for fields are converted to motion vectors for frames, the motion vectors for frames are converted in such a way that the motion vectors relate exclusively to the previous frame, motion vectors possibly missing from a frame for one or more blocks are determined by filtering from the motion vectors of blocks of the same frame and/or blocks of the previous frame, a block row and a block column, in which the x components of the motion vectors have the smallest spread, and a block row and block column, in which the y components of the motion vectors have the smallest spread, are selected from the motion vectors thus preprocessed, the global motion vectors are calculated for each frame, in which the x components of the preprocessed motion vectors required for their calculation are taken exclusively from the block row and block column selected for these components, and in which the required y components of the preprocessed motion vectors are taken exclusively from the block row and block column selected for these components, while a value situated in an average spread range is selected from the preprocessed motion vectors of the selected block rows and the selected block columns.

14 Claims, 4 Drawing Sheets

$v_1 = f_1$
$v_2 = \text{Med}(v_1, f_2/2, -b_1/2)$
$v_3 = -b_2$

METHOD OF CALCULATING MOTION VECTORS

BACKGROUND OF THE INVENTION

1. Field of the Invention

The invention relates to two embodiments of a method of calculating global motion vectors indicating the global motion of the picture contents in each frame or field of a digital picture signal for which motion vectors are provided which are valid for a block of pixels of a field and/or frame of the picture signal.

2. Description of the Related Art

The article "Upconversion MPEG-ubertragener Bildsignale" by Appelhans, Bussmann, Schroder, published in the 17th volume (1996, pp. 555–572) of the Fernsehund Kinotechnischen Gesellschaft describes a method in which it is attempted to use the block-sequential motion vectors of a digital picture signal for further analog processing of the picture contents, for example, for 100 Hz conversion. Such a further processing of these vectors has, however, proved to be very inefficient in that it involves almost as much effort as a completely new calculation of the motion vectors.

SUMMARY OF THE INVENTION

In contrast to this method, it is an object of the present invention to provide global motion vectors which more or less indicate motions of the overall picture contents of a field or a frame, such as are caused, for example, by camera pans and camera zooms or by rotations of the picture contents. This method aims at efficiency and, consequently requires little effort.

A first embodiment of the method according to the invention, in which the global motion vectors are calculated for frames, is characterized in that motion vectors provided for fields are converted to motion vectors for frames, the motion vectors for frames are converted in such a way that the motion vectors relate exclusively to the previous frame, motion vectors possibly missing from a frame for one or more blocks are determined by means of filtering from the motion vectors of blocks of the same frame and/or blocks of the previous frame, a block row and a block column, in which the x components of the motion vectors have the smallest spread, and a block row and block column, in which the y components of the motion vectors have the smallest spread, are selected from the motion vectors thus preprocessed, the global motion vectors are calculated for each frame, in which the x components of the preprocessed motion vectors required for their calculation are taken exclusively from the block row and block column selected for these components, and in which the required y components of the preprocessed motion vectors are taken exclusively from the block row and block column selected for these components, while a value situated in an average spread range is selected from the preprocessed motion vectors of the selected block rows and the selected block columns.

The digital picture signal whose motion vectors are processed may be, for example, a picture signal of the MPEG-2 standard. In accordance with this standard, motion vectors indicating the motion for a block of pixels within the picture, are calculated for fields and/or frames. These motion vectors may relate to different other frames or fields of previously or subsequently transmitted fields or frames. It is not necessary that motion vectors exist for all fields or frames. Such vectors may also exist for some blocks within a field or a frame, but not for other blocks. These vectors or vector fields are initially unsuitable for indicating the global motion within the picture contents, because they are not related to equal frames or fields, are not completely available and indicate different motions within a picture.

For the first embodiment of the method according to the invention, in which global motion vectors are to be calculated which indicate the global motion of the picture contents of a frame via the previous frame, those motion vectors relating to fields in the original digital picture signal are converted to motion vectors relating to frames. As is common practice, this applies block-sequentially to the respective assigned motion vectors.

Since, as explained above, the motion vectors may relate to different previously or subsequently transmitted pictures, the motion vectors relating to frames are further converted in such a way that they indicate the motion relative to the previously transmitted frame.

Since, as explained above, motion vectors may not be assigned to all blocks of a frame of the digital picture signal, a filtering of blocks within a frame and/or blocks within the previous frame is performed, in which the motion vectors which may be missing are calculated from the available motion vectors. Methods such as, for example median filtering, averaging or the like, may be used for this purpose.

Now, there is a motion vector within each frame for each block which indicates the motion of the picture contents of this block relative to the previous frame. These motion vectors, referred to hereinafter as preprocessed motion vectors, are used for the further calculation.

Within a frame, there may not only be a global motion as may be caused, for example, by camera pans, zooms or rotations of the picture contents, but also motions of single objects within the picture. When calculating the global motion vectors, these partial motions within the picture contents are disturbing because only the global motion is to be determined. It is therefore attempted to determine parts of the picture contents which comprise exclusively global motions, and motion parameters of only such parts are used for the further calculation of the global motion vectors.

Moreover, the x and y components of the motion vectors are required separately for calculating the global motion vectors. Therefore, those areas of the picture which optimally represent the global motion are selected separately according to x components and y components of the motion vectors.

First, a block row and a block column are searched whose x components of the motion vectors have the smallest spread. When selecting this block row and block column, only the x components of the motion vectors are thus taken into account; their y components are not taken into account. The row whose x components of the motion vectors have the smallest spread is selected, as it can be assumed for this row that its blocks comprise no, or substantially no, local motion in the x direction, because the x vectors have a relatively large spread in the case of local motions. Similarly, the column whose x components have the smallest spread is selected. As a result, a block row and a block column have then been found whose motion vectors assigned to the blocks have the smallest spread as regards their x components and can therefore be used for the further calculation of the global motion parameters.

A block row and a block column whose y components have the smallest spread are selected in a corresponding manner.

As a result, two block rows and two block columns have been selected, one of which has the smallest spread as regards the x components and the other has the smallest spread as regards the y components and thus optimally represents the global motion in this direction.

Now, the global motion parameters are calculated. Exclusively x components of the selected block rows or block columns assigned to these components and, in a corresponding manner, exclusively y components of the selected block rows and block columns assigned to these components are used for this purpose.

When calculating the global motion vectors from the preprocessed motion vectors of the selected block rows and block columns, a value in the average spread range of each component of the block rows and block columns is selected within these rows and columns.

Based on these values, the motion parameters of the global motion vectors may be calculated, dependent on how many and which parameters are to be determined.

An implementation of this first embodiment of the invention has for its object to calculate possibly missing motion vectors in the vector fields. This can be advantageously done by means of a median filtering method because, in this method, missing motion vectors are taken over by actually existing motion vectors of other adjacent blocks of the same frame or blocks having the same position in the previous frame and no new vectors are calculated.

A further implementation of the first embodiment of the invention has for its object to perform a smoothing operation within the preprocessed motion vectors so as to eliminate "outliers", if any. This may also be done advantageously by means of median filtering.

As already explained above, motion vectors relating to fields are converted to motion vectors relating to frames. In accordance with a further implementation of the invention, the average values of the motion vectors of two fields of a frame are calculated. However, only those motion vectors of the two fields are evaluated which relate to fields of the same kind. Thus, for the first field of the frame, only those motion vectors which relate to the first field of another frame are taken into account. The same applies to motion vectors of the second field of the frame.

If the digital picture signal is a signal of the MPEG-2 standard, a further implementation of the first embodiment of the invention leads to a satisfactory calculation result of the motion vectors because two motion vectors pointing forwards and backwards are generally given for the pictures of the B category.

For the motion vectors assigned to the pictures of the B category of the MPEG-2 transmission standard, the following method is preferably used.

Pictures of three categories B, I and P are provided within the MPEG-2 picture sequence. Pictures of the I category are completely coded as regards their picture contents but do not comprise any motion vectors. Pictures of the P category are only coded as regards the variation of their picture contents and have motion vectors pointing in one direction only. Pictures of the B category are also coded as regards the variation of their picture contents and have motion vectors pointing in both directions, thus pointing at previously transmitted pictures and at subsequently transmitted pictures.

In a this method, the motion vectors relating to each previous frame, as required for the method according to the invention, are calculated from the motion vectors of the pictures of the MPEG category B.

As explained above, the block rows and block columns are selected separately according to x components and y components of the motion vectors of the blocks. Here, those block rows and columns are searched whose respective components have the smallest spread. In this selection, a further implementation of the first embodiment of the invention may be used advantageously. By means of the performed subtraction and subsequent addition of the amounts of the differences, it can be directly determined by way of the resultant sum or their value which block row or block column has the smallest spread as regards the searched component.

The global motion vectors may be calculated by means of a regression analysis which corresponds to the calculation of a straight line or plane of equalization and represents a known mathematical method.

Alternatively, a simple subtraction of neighboring vectors within the selected block row and block column can be performed. This is possible due to the preselection of the block rows and block columns.

In the case of both calculation methods, it should be noted that, for the x components and y components, the block rows and block columns assigned to these components are used for the calculation.

The global motion vectors to be calculated may be formed, for example, as equations. In this case, parameters indicating the translation of the picture contents in the relevant direction, zooming of the picture contents in the relevant direction and a rotation in both possible directions can be calculated. A very accurate calculation of the global picture contents is given in this case. For example, the parameters indicating the rotation of the picture contents may be omitted for the purpose of simplification.

The subtraction as described above of neighboring motion vectors within the selected block rows and block columns may be used for calculating the global motion vector with the above equations. However, this is always done separately according to x and y components.

With this relatively simple calculation, it is possible to determine global motion vectors with little calculation effort, which motion vectors nevertheless represent the global picture contents in a very good approximation because spreads, outliers and particularly regional motions within the picture are filtered out.

The first embodiment of the invention hitherto described has for its object to calculate global motion vectors related to frames. However, the second embodiment of the invention, has for its object to indicate motion vectors which are related to fields. This second embodiment describes a method which is very similar to the first method and is distinguished in detail only in that motion vectors related to fields are taken into account and calculated.

Dependent on the purpose for which the global motion vectors are used, the first or second embodiment of the invention may be used advantageously.

The implementations of the first embodiment of the invention are also applicable to the second embodiment of the invention, using and calculating vectors relating to fields instead of frames.

These and other aspects of the invention are apparent from and will be elucidated with reference to the embodiments described hereinafter.

DESCRIPTION OF THE PREFERRED EMBODIMENTS

Figure 1:
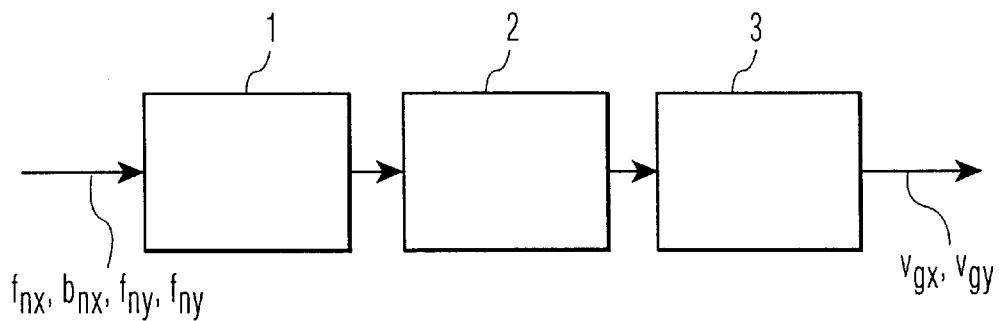
FIG. 1 shows the steps of the method in a diagrammatic configuration.

FIG. 1 shows the steps of the method according to the invention, in a very simplified form. Global motion vectors $v_{gx}$ and $v_{gy}$, relating to a frame, are to be calculated from the original motion vectors of the digital picture signals. Theses motion vectors may relate to fields and/or frames and may not be completely present for all blocks of a field or a frame and are denoted by $f_{nx}$, $b_{nx}$, $f_{ny}$ and $b_{ny}$ in the Figure.

For this embodiment, it will hereinafter be assumed that the digital picture signal is a signal of the MPEG-2 standard. Within such a signal of the MPEG-2 standard, motion vectors f and b are given for pictures of the B category, which motion vectors may, however, be related to fields or frames. The global motion vectors $v_{gx}$ and $v_{gy}$, relating to frames in this embodiment, are calculated by means of the method according to the invention.

In FIG. 1, a first block 1 represents the steps of converting the motion vectors. Possibly relating to fields, to motion vectors relating to frames, converting the motion vectors relating to frames to motion vectors relating to the previous frame, and calculating missing motion vectors by means of filtering from the motion vectors of the same frame and/or the previous frame. If necessary, this step may also include a smoothing of the block-wise provided motion vectors by means of median filtering.

The step of selecting the block rows and block columns is indicated by means of the further block 2 in FIG. 1, with motion vectors whose x and y components have the smallest spread.

The subsequent block 3 symbolizes the calculation of the motion parameters for the global motion vectors from the x and y components of the assigned block rows and block columns resulting from the step of the method shown in block 2.

Figure 2:
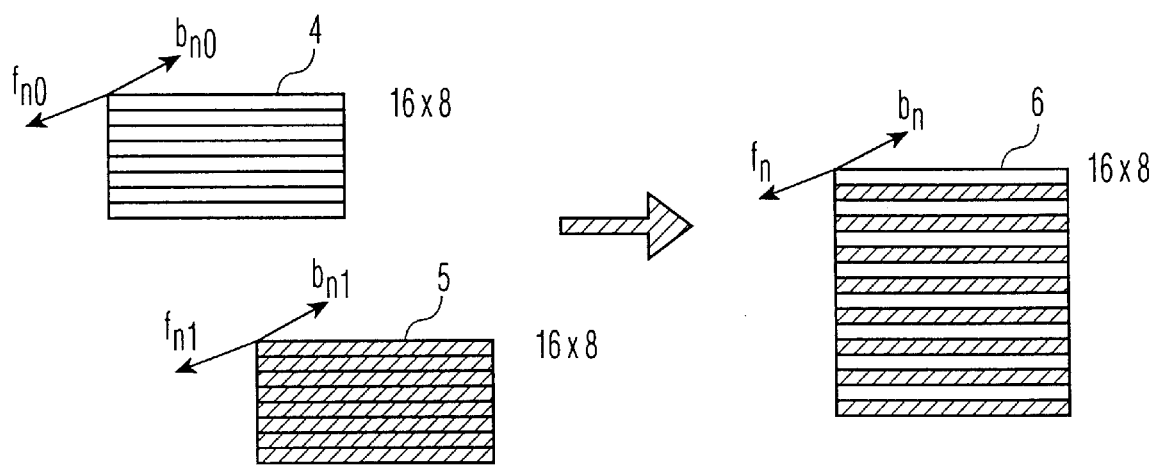
FIG. 2 shows, diagrammatically, the calculation of motion vectors relating to frames from motion vectors of an MPEG-2 signal possibly relating to fields.

FIG. 2 shows, by way of example, how motion vectors relating to fields can be converted to motion vectors relating to frames in the first step of the method represented by block 1 in FIG. 1. For example, motion vectors $f_{n0}$ and $b_{n0}$ are indicated in a first field 4 with 16×8 pixels in FIG. 2. Motion vectors $f_{n1}$ and $b_{n1}$ are indicated for a second field 5. In this case, it is important that only those motion vectors f and b which relate to homogeneous fields are used.

The motion vectors $f_n$ and $b_n$ relating to the frame 6, composed of the fields 4 and 5, are calculated by means of the equations indicated in FIG. 2. A simple averaging of the respective motion vectors of the two fields 4 and 5 is performed in this case.

Figure 3:
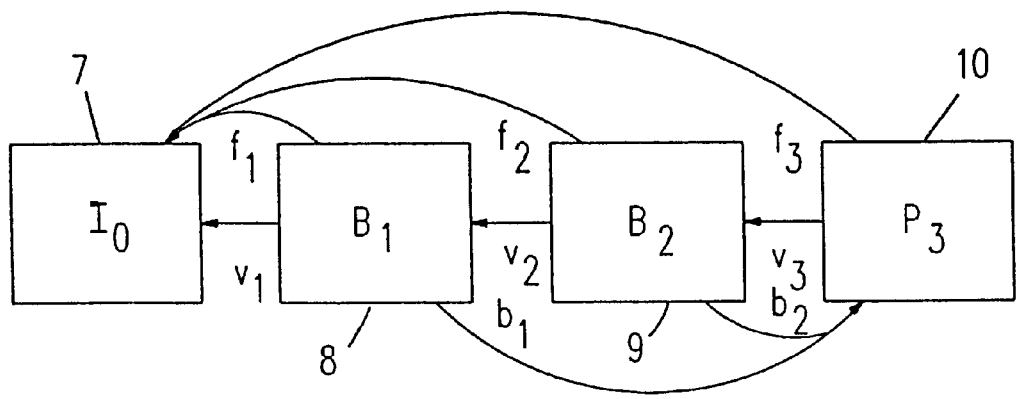
FIG. 3 shows an example of calculating motion vectors relating to the relevant previous frame from MPEG-2 motion vectors.

In the block 1 shown in FIG. 1, the available motion vectors should further be converted in such a way that the motion vectors relating to frames, each time, relate to the previous frame. FIG. 3 shows an example of such a conversion.

In the example, first a picture 7 of the I category $I_0$, subsequently two pictures 8 and 9 of the B category $B_1$ and $B_2$, and thereafter a picture 10 of the P category $P_3$, are transmitted within an MPEG-2 data stream. All pictures 7 to 10 are frames. The data of the picture $I_0$ comprise its picture contents in a complete form but no motion vectors. The data of the pictures 8 and 9 of the categories B and P comprise only variations of the picture contents. However, motion vectors also belong to pictures of this category. A motion vector $f_3$, indicating the motion of its picture contents (block-wise) relative to the picture contents of picture $I_0$, belongs to the picture $P_3$. Two motion vectors $b_1$, $f_1$ and $f_2$, $b_2$, block-wise indicating the motion of their picture contents relative to the pictures $I_0$ and $P_3$, belong to the pictures 8 and 9 of the B category $B_1$ and $B_2$.

The MPEG motion vectors f and b of the B pictures are preferably used for calculating the global motion vectors in accordance with the invention. The calculation is performed in accordance with the equations shown in FIG. 3. The motion vectors $v_1$, $v_2$ and $V_3$ can thereby be calculated, these motion vectors exclusively indicating the motion of the picture contents of each frame relative to the picture contents of the previous frame. These motion vectors are still present block-wise.

Figure 4:
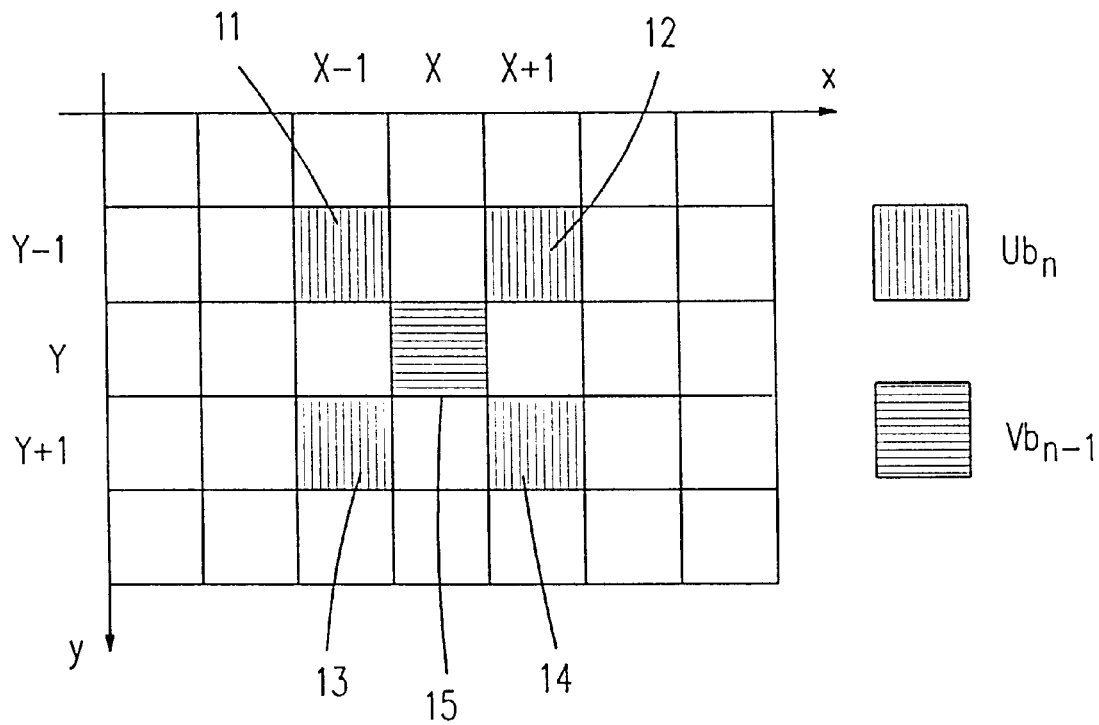
FIG. 4 shows, diagrammatically, the calculation of missing motion vectors.

Such motion vectors may not be present for all picture blocks within a frame. A very flexible coding is given within the MPEG data stream so that no motion vectors may be indicated for blocks within a frame. However, since these motion vectors should advantageously exist for the further calculation of the global motion vectors, the missing motion vectors are calculated. This may be done, advantageously, in accordance with the method shown diagrammatically in FIG. 4. A median filtering is used in this case. The missing motion vectors of a block x and y in the frame $Vb_n$ in FIG. 4 are calculated by median filtering from the motion vectors of the block 15 having the same position as the previous image $Vb_{n-1}$ and the motion vectors of the diagonal neighbors 11, 12, 13 and 14 of the same frame $Vb_n$.

Figure 5:
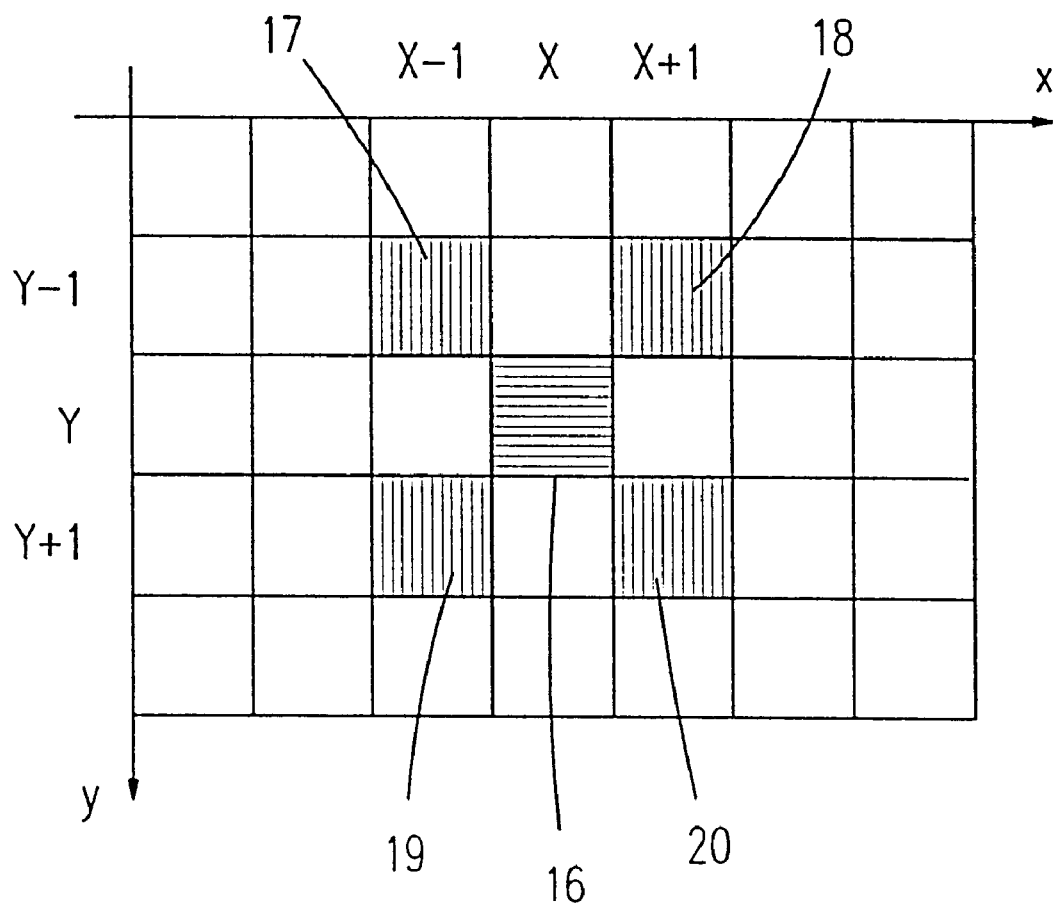
FIG. 5 similarly shows the smoothing of the motion vectors.

In accordance with the steps of the method shown in FIGS. 1 to 4, the preprocessed motion vectors are fundamentally present. There are still block-wise motion vectors for each frame. To reduce the spread within the motion vectors within a frame, a further step of the method, indicated in FIG. 5, may be used advantageously. In this step, a smoothing is performed within the vector field of a frame. This can be done, advantageously, by way of median filtering, with the motion vectors of a block 16 of the position x and y jointly with the motion vectors of each diagonal neighbor 17, 18, 19 and 20 being subjected to a median filtering and the result being used as new motion vectors of the block 16 of the position x, y. This leads to a smoothing of the vector field; outliers are eliminated.

With reference to the diagrammatical representation in FIG. 1, the preprocessing operation is now finished, and preprocessed motion vectors are now provided for each frame and for each block within each frame. Subsequently, suitable block rows and block columns are selected, which is indicated by block 2 in FIG. 1.

Figure 6:
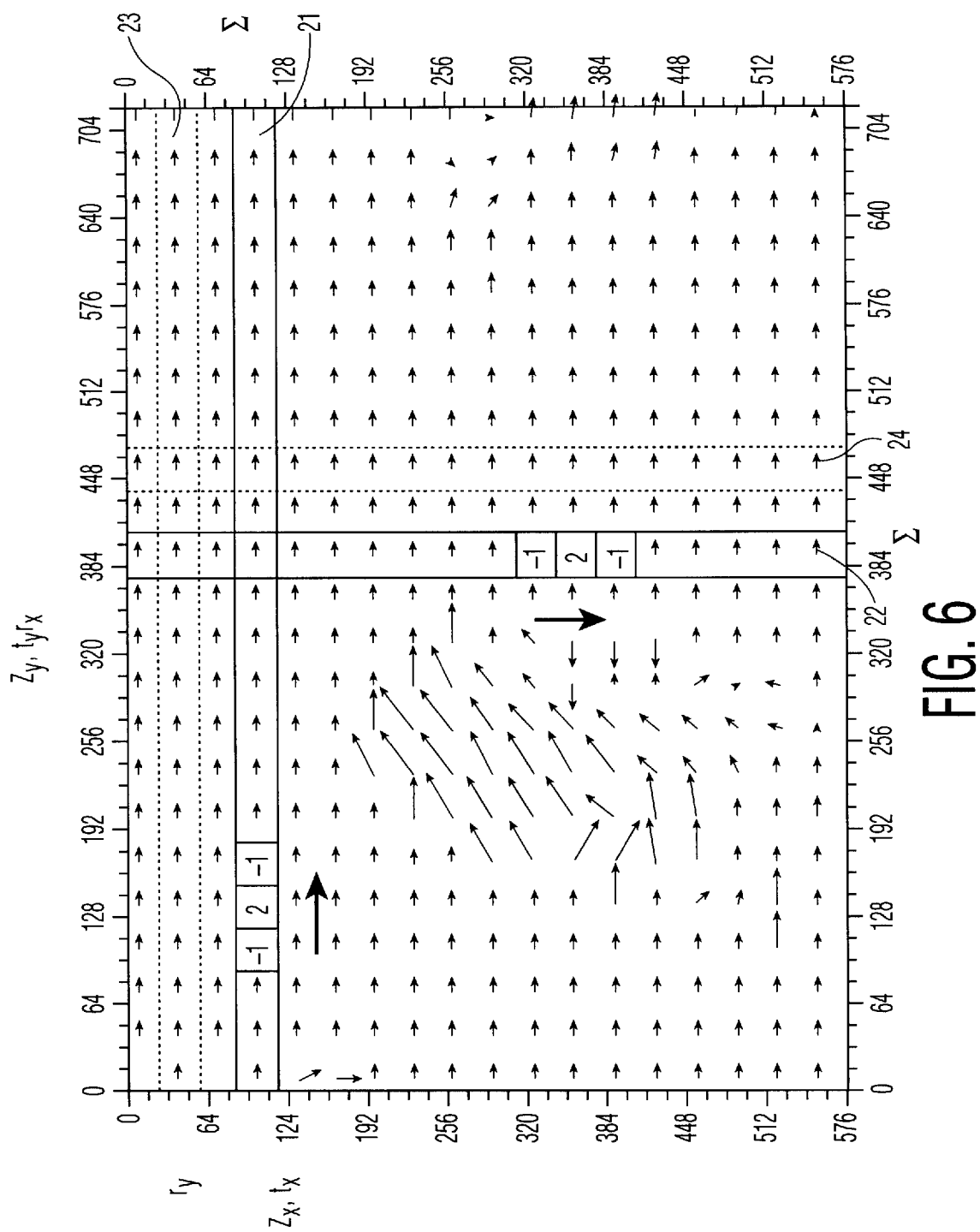
FIG. 6 shows, diagrammatically, the blocks of a frame, their preprocessed motion vectors and the selection of block rows and block columns performed separately according to x and y components.

Such a selection is shown diagrammatically in FIG. 6.

It was assumed hereinbefore that each block of each frame comprises 16×16 pixels. Thus, a corresponding number of blocks within a frame, and hence a corresponding number of motion vectors are provided. In FIG. 6, only every second block is shown for the sake of simplicity.

The block rows and block columns are selected separately according to x components and y components of the motion vectors.

In the first step of the method, only the x components of the motion vectors are taken into account. Initially, a row 21 is searched whose x component has a minimal spread. In this case, for example, a sum may be formed at which the x component of the motion vector of each block is doubly weighted and the difference with each singly weighted x component of the motion vectors of the two neighboring blocks is formed. This difference is formed separately for each block of each row. A summation of the amounts of these differences is performed for each row. Subsequently, the row 21, for which this sum is smallest, is selected. Based on the kind of filtering, the row whose x components of the motion vectors have the smallest spread is thereby selected.

Similarly, a column 22 is searched whose x components have the smallest spread.

Thus, in accordance with these two steps of the method, a block row 21 and a block column 22 have been found whose x components have the smallest spread. For further processing the global motion vectors, only the x components of this selected block row 21 and this selected block column 22 are used for the required x components.

A block row 23 and a block column 24, whose y components have the smallest spread, are selected in a corresponding manner. They are calculated in the same way as described above.

As a result, two selected block rows 21 and 23 are provided in this step of the method, one of which (21) has the smallest spread as regards the x components of its motion vectors and the other (23) has the smallest spread as regards the y components of its motion vectors. Moreover, there are two selected columns 22 and 24 which also have the smallest spread as regards the x components and the y components, respectively.

The global motion vectors may be calculated, for example by means of a regression analysis, from the motion vectors which are now provided for the selected block rows 21 and 23 and block columns 22 and 24, separately according to x and y components which are generated exclusively from the respective assigned block rows and block columns. Such a regression analysis corresponds to a known mathematical method of calculating a straight line or plane of equalization.

However, as a row and column-preselection of the motion vectors has taken place, a simplified calculation by means of subtraction may also be performed.

For example, if the global motion vectors are formed in accordance with the formulas:

$$v_{gx}(x, y) = t_x + z_x \cdot x + r_x \cdot y$$

$$v_{gy}(x, y) = t_y + z_y \cdot y + r_y \cdot x$$

the parameters $t_x$ and $t_y$, $z_x$, $z_y$ and $r_x$ and $r_y$ within the motion vectors are to be calculated. Among these parameters, the parameters t indicate a translatory movement in the relevant direction, the parameters z indicate a zoom motion in the relevant direction and the parameters r indicate a rotation of the relevant direction.

The parameters may be calculated, for example, in accordance with the formulas:

$$t_x = \frac{1}{n_x} \sum_x v_x(x, y) - r_x \cdot y$$

$$t_y = \frac{1}{n_y} \sum_y v_y(x, y) - r_y \cdot x$$

-continued $$z_x = \frac{1}{n_{x-1}} \sum_x v_x(x, y) - v_x(x-1, y)$$

$$z_y = \frac{1}{n_{y-1}} \sum_y v_y(x, y) - v_y(x, y-1)$$

$$r_x = \frac{1}{n_{y-1}} \sum_y v_x(x, y) - v_x(x, y-1)$$

$$r_y = \frac{1}{n_{x-1}} \sum_x v_y(x, y) - v_y(x-1, y)$$

In this case, a subtraction and a summation are used. Within these equations, $n_x$, denotes the number of blocks within a block row and ny denotes the number of blocks within a block column. The values $v_x(x,y)$ and $v_y(x,y)$ are the x and y components, respectively, of the motion vectors of the relevant assigned block rows and block columns. Values, such as x-1 and y-1, indicate that the previous block in the same row or the same column, or its parameter components, is used each time in the calculation.

It should be noted that the motion parameters $v_x$, and $v_y$ from only the assigned selected block rows and block columns are used. For example, for calculating the parameter $z_x$, the blocks adjacent to the x components of the motion vectors are subtracted. In this case, only the x components of the row selected therefor are used. These differences formed for the whole block row are summed and divided by the number of blocks of this row minus 1.

In a corresponding manner, the other parameters can be calculated in accordance with these formulas.

The calculated parameters $t_x$, $t_y$, $z_x$, $z_y$, $r_x$ and $r_y$ are then used in the above-mentioned equations for the global motion vectors, so that global motion vectors $v_x$ and $v_y$ indicating the frame-related global motion of the picture contents of this frame are provided.

I claim:

1. A method of calculating global motion vectors indicating the global motion of picture contents in each frame of a digital picture signal for which motion vectors are provided which are valid for a block of pixels of a field and/or frame of the picture signal, characterized in that said method comprises the steps:

converting motion vectors provided for fields to motion vectors for frames;

converting the motion vectors for frames in such a way that the motion vectors relate exclusively to a previous frame;

determining motion vectors possibly missing from a frame for one or more blocks by filtering from the motion vectors of blocks of the same frame and/or blocks of the previous frame;

selecting, from the motion vectors thus preprocessed, a block row and a block column, in which the x components of the motion vectors have the smallest spread, and a block row and block column, in which the y components of the motion vectors have the smallest spread; and calculating the global motion vectors for each frame, in which the x components of the preprocessed motion vectors required for the calculation are taken exclusively from the block row and block column selected for these components, and in which the required y components of the preprocessed motion vectors are taken exclusively from the block row and block column selected for these components, while a value situated in an average spread range is selected from the preprocessed motion vectors of the selected block rows and the selected block columns.

2. A method as claimed in claim 1, characterized in that said step of determining possibly missing motion vectors comprises median filtering from the motion vector-adjacent blocks of the same frame and/or from the motion vectors of at least one block of the previous frame, particularly the block having the same position in the previous frame.

3. A method as claimed in claim 1, characterized in that said method further comprises, for each block of a frame, median filtering the preprocess motion vectors prior to said step of selecting the block rows and block columns, said median filtering including a motion vector of the block and the motion vectors of neighbors of said block.

4. A method as claimed in claim 1, characterized in that said step of converting the motion vectors relating to fields comprises averaging the motion vectors of two fields of a frame, taking into account only motion vectors which relate to homogeneous fields.

5. A method as claimed in claim 1, wherein said digital picture signal is in accordance with the MPEG-2 standard, characterized in that said method comprises the step:

converting the MPEG-2 motion vectors to motion vectors relating exclusively to the previous frame in such a way that motion vectors of pictures of a B category in accordance with MPEG-2 are used for calculating the global motion vectors.

6. A method as claimed in claim 5, characterized in that said step of converting the MPEG-2 motion vectors comprises:

taking over the MPEG motion vector f of the frame B indicating the I or P picture for frames of the MPEG category B, following a picture of the MPEG category I or P;

taking over, in an inverted form, the MPEG motion vector b of the frame B indicating the I or P picture for frames of the MPEG category B transmitted directly before a picture of the MPEG category I or P; and median filtering, for frames of the MPEG category B transmitted between pictures of the MPEG category B, from the converted motion vector of the previously transmitted picture of the MPEG category B, from the inverted value multiplied by a first weighting factor of the b vector of the frame B indicating the previous picture of the MPEG category I or P and from the value multiplied by a second weighting factor of the f vector of the frame B indicating the subsequent picture of the MPEG category I or P, the value of the weighting factors being dependent on the distance between the picture of the B category and the pictures of the I or P category.

7. A method as claimed in claim 1, characterized in that the preprocessed motion vectors are determined for blocks of 16×16 pixels of a frame.

8. A method as claimed in claim 1, characterized in that said step of selecting the block rows and block columns of a frame whose preprocessed motion vectors optimally indicate the global motion of the picture contents, is separately performed for the x and y components of the motion vectors, and comprises the steps:

subtracting, in each block row and each block column of a frame, for each block from the doubly weighted x components of the motion vectors of said block and from the x, components of the motion vectors of the two row or column-adjacent blocks;

selecting the x component row and column which is smallest for the sum of the amounts of said subtractions performed for all blocks of the row or the column;

subtracting, in each block row and block column of a frame, for each block from the doubly weighted y components of the motion vectors of said block and from the y components of the motion vectors of the two row or column-adjacent blocks; and selecting the y component row and column which is smallest for the sum of the amounts of said subtractions performed for all blocks of the row or column.

9. A method as claimed in claim 8, characterized in that block rows and block columns arranged at the edge of a frame are not taken into account when selecting the block rows and block columns of said frame, particularly in that the motion vectors of the blocks of the first and last block row of each frame as well as the two first and last block columns of each frame are not taken into account.

10. A method as claimed in claim 1, characterized in that said step of calculating the global motion vectors from the preprocessed motion vectors of the selected block rows and block columns comprises a regression analysis.

11. A method as claimed in claim 1, characterized in that said step of calculating the global motion vectors from the preprocessed motion vectors of the selected block rows and block columns comprises a simplified calculation by subtracting neighboring vectors.

12. A method as claimed in claim 1, characterized in that the global motion vectors $v_{gx}$ and $v_{gy}$ are formed as $$v_{gx}(x, y) = t_x + z_x \cdot x + r_x \cdot y$$

and $$v_{gy}(x, y) = t_y + z_y \cdot y + r_y \cdot x$$

in which the parameters $t_x$ and $t_y$ correspond to a translation of the picture contents in the x and y directions, respectively, the parameters $z_x$ and $z_y$ correspond to a zooming of the picture contents in the x and y directions, respectively, and the parameters $r_x$ and $r_y$ correspond to a rotation of the picture contents.

13. A method as claimed in claim 11, characterized in that the parameters of the global motion vectors $v_{gx}$ and $v_{gy}$ are calculated from the preprocessed motion vectors $v_x$ and $v_y$ of the selected block row and the selected block column in accordance with the formulas:

$$t_x = \frac{1}{n_x} \sum_x v_x(x, y) - r_x \cdot y$$

$$t_y = \frac{1}{n_y} \sum_y v_y(x, y) - r_y \cdot x$$

$$z_x = \frac{1}{n_{x-1}} \sum_x v_x(x, y) - v_x(x-1, y)$$

$$z_y = \frac{1}{n_{y-1}} \sum_y v_y(x, y) - v_y(x, y-1)$$

$$r_x = \frac{1}{n_{y-1}} \sum_y v_x(x, y) - v_x(x, y-1)$$

$$r_y = \frac{1}{n_{x-1}} \sum_x v_y(x, y) - v_y(x-1, y)$$

in which $n_x$ indicates the number of vectors or blocks of a block row and $n_y$ indicates the number of vectors or blocks of a block column.

14. A method of calculating global motion vectors indicating the global motion of picture contents in each field of a digital picture signal for which motion vectors are provided which are valid for a block of pixels of a field and/or frame of the picture signal, characterized in that said method comprises the steps:

converting motion vectors provided for frames to motion vectors for fields;

converting the motion vectors for fields in such a way that the motion vectors relate exclusively to a previous field;

determining motion vectors possibly missing from a field for one or more blocks by filtering from the motion vectors of blocks of the same field and/or blocks of the previous field;

selecting, from the motion vectors thus preprocessed, a block row and a block column, in which the x components of the motion vectors have the smallest spread, and a block row and block column, in which the y components of the motion vectors have the smallest spread; and calculating the global motion vectors for each field, in which the x components of the preprocessed motion vectors required for their calculation are taken exclusively from the block row and block column selected for these components, and in which the required y components of the preprocessed motion vectors are taken exclusively from the block row and block column selected for these components, while a value situated in an average spread range is selected from the preprocessed motion vectors of the selected block rows and the selected block columns.

* * * * *